United States Patent [19]

Wasden

[11] Patent Number: 5,062,560
[45] Date of Patent: Nov. 5, 1991

[54] FLEXIBLE PROTECTIVE BICYCLE COVER FOR TRANSPORT ON A VEHICLE CARRIER

[76] Inventor: Kent J. Wasden, 3680 North 250 East, Rexburg, Id. 83440

[21] Appl. No.: 420,013

[22] Filed: Oct. 11, 1989

[51] Int. Cl.⁵ .............................................. B60R 9/10
[52] U.S. Cl. .................................. 224/328; 224/318; 224/42.03 B; 150/167; 206/335; 296/78.1; 296/136
[58] Field of Search ............... 150/166, 167; 206/335; 224/42.03 A, 42.03 B, 30 R, 316, 318, 319, 328; 296/78.1, 136; 297/184, 214, 217; 280/160.1, 288.4

[56] References Cited

U.S. PATENT DOCUMENTS

| | | | |
|---|---|---|---|
| D. 27,645 | 9/1897 | Mack | D12/156 |
| D. 268,546 | 4/1983 | Edery | D3/71 X |
| 536,538 | 3/1895 | McIntire | 297/184 |
| 1,853,742 | 4/1932 | Owen et al. | 150/167 X |
| 2,787,311 | 4/1957 | Cohen et al. | 150/166 |
| 3,537,746 | 11/1970 | Peters | 297/184 X |
| 3,968,913 | 7/1976 | Weed et al. | 150/167 X |
| 4,009,744 | 3/1977 | Joslyn | 150/167 |
| 4,171,145 | 10/1979 | Pearson, Sr. | 150/167 X |
| 4,283,084 | 8/1981 | Gallagher | 296/78.1 |
| 4,356,813 | 11/1982 | Adams | 150/167 |
| 4,378,883 | 4/1983 | Profeta | 150/167 |
| 4,632,416 | 12/1986 | Zelenetz | 280/304.3 |
| 4,715,646 | 12/1987 | Goffi et al. | 150/167 X |
| 4,786,104 | 11/1988 | Fellenbaum | 297/195 |

FOREIGN PATENT DOCUMENTS

| | | | |
|---|---|---|---|
| 950059 | 10/1956 | Fed. Rep. of Germany | 150/167 |
| 3526208 | 1/1987 | Fed. Rep. of Germany | 296/78.1 |
| 3643355 | 6/1988 | Fed. Rep. of Germany | 224/30 R |
| 2476583 | 8/1981 | France | 206/335 |
| 279817 | 4/1952 | Switzerland | 296/78.1 |
| 291977 | 10/1953 | Switzerland | 150/167 |
| 25592 | of 1898 | United Kingdom | 296/78.1 |
| 12658 | 4/1898 | United Kingdom | 296/78.1 |
| 2299 | of 1906 | United Kingdom | 296/78.1 |

*Primary Examiner*—Sue A. Weaver
*Attorney, Agent, or Firm*—Robert de Groot; Stephen A. Gratton

[57] ABSTRACT

A flexible protective cover constructed of elastic stretchable material to continously cover a bicycle seat, crossbar, handle bars and the front fork of a bicycle when mounted on a car top carrier. The cover can be provided to fit the bicycle either with or without the front bicycle wheel attached to the bicycle.

5 Claims, 4 Drawing Sheets

FLEXIBLE PROTECTIVE BICYCLE COVER FOR TRANSPORT ON A VEHICLE CARRIER

BACKGROUND OF THE INVENTION

This invention relates to a flexible protective cover for use on a bicycle while transported by a vehicle. The cover provides protection for the seat, handle bar portion and front fork portion of the bicycle from dust, bugs, grime, dirt and water while traveling. It provides a streamlined shape as a result of using a conforming stretchable material that extends from the seat, over the handle bars and down to the bottom of the front fork.

Typically, most bicycle riders do not cover their bicycles while transporting them on automobile roof carriers, trailers, bumper carriers or otherwise. With increasingly complex bicycle technology and consequent higher costs (in the thousands of dollars for professional racing bicycles) it becomes increasingly more important to protect the critical or sensitive bicycle parts from damage or soiling due to travel related contaminants.

To this end, a flexible protective cover for drive train elements of a bicycle is disclosed in U.S. Pat. No. 4,632,416, issued on Dec. 30, 1986. This cover protects only the front drive sprocket, the chain and the rear sprocket and adjacent gear shift mechanisms. Alternatively, entire bicycle covers have been sold for a number of years which envelope the entirety of the bicycle. Such covers serve the purpose of protecting expensive bicycle parts from damage or soiling, but are intended for use only while the bicycle is being stored. They would present a serious problem if used when transporting a bicycle on top of a car, since cross-winds striking the large expanse of fabric would likely push the bicycle laterally, causing serious damage to the bicycle and/or the bicycle carrier.

Therefore, it is the purpose of this invention to provide a cover that protects the bicycle from airborne objects and contaminants while traveling at highway speeds, while not subjecting the bicycle to destabilizing lateral forces.

SUMMARY OF THE INVENTION

The apparatus of the present invention is in the nature of a flexible cover attached to a bicycle that is being transported by a vehicle, such as when mounted on a car top bicycle carrier. The cover is made of a stretchable material and has waterproof portions adapted to keep the seat dry while being transported. In one embodiment, this invention includes a cover to protect the seat, the crossbar, the handle bar portion and extends down to the front yoke and fork. In a second embodiment, the cover protects only the seat, cross bar and handle bar portions. This embodiment can be used when the front bicycle wheel is left on the bicycle during transportation, thereby protecting the upper portions of the bicycle.

The stretchable material is used to tightly envelope the protected portions and maintain the cover over the seat, handle bar and yoke of the bicycle and prevent flapping or flutter when traveling at highway speeds. The stretchable material may have elastic means sewn into the periphery to aid in gripping the seat and handle bar portions. Because of its minimal use of fabric, the cover of this invention has a small cross-wind profile, when viewed from the side, thereby minimizing the tendency for the bicycle to topple sideways in a cross-wind. While the car is in motion the front profile of the cover shields all major bicycle parts except the pedals from road grime and objects approaching the bicycle from the front quadrant of the bicycle.

DETAILED DESCRIPTION OF THE INVENTION

Figure 2:
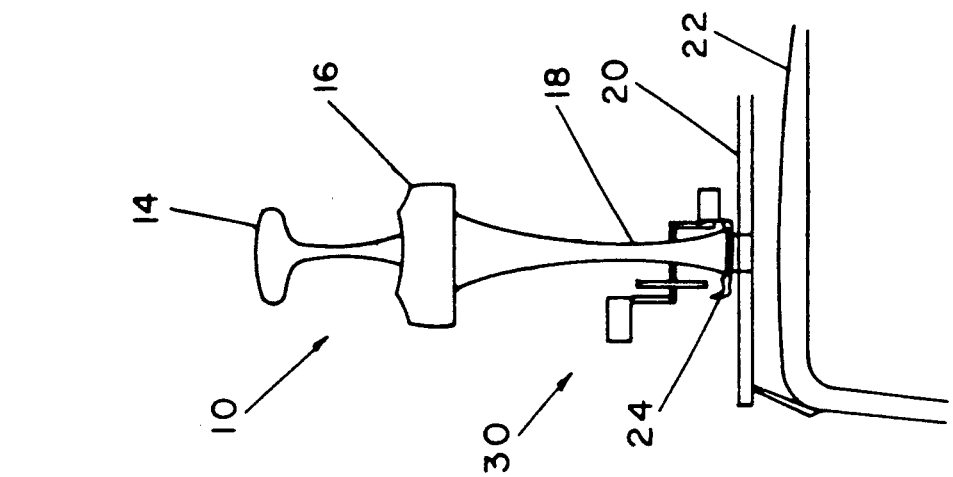
FIG. 2 is a front view of the covered bicycle of FIG. 1.
Figure 1:
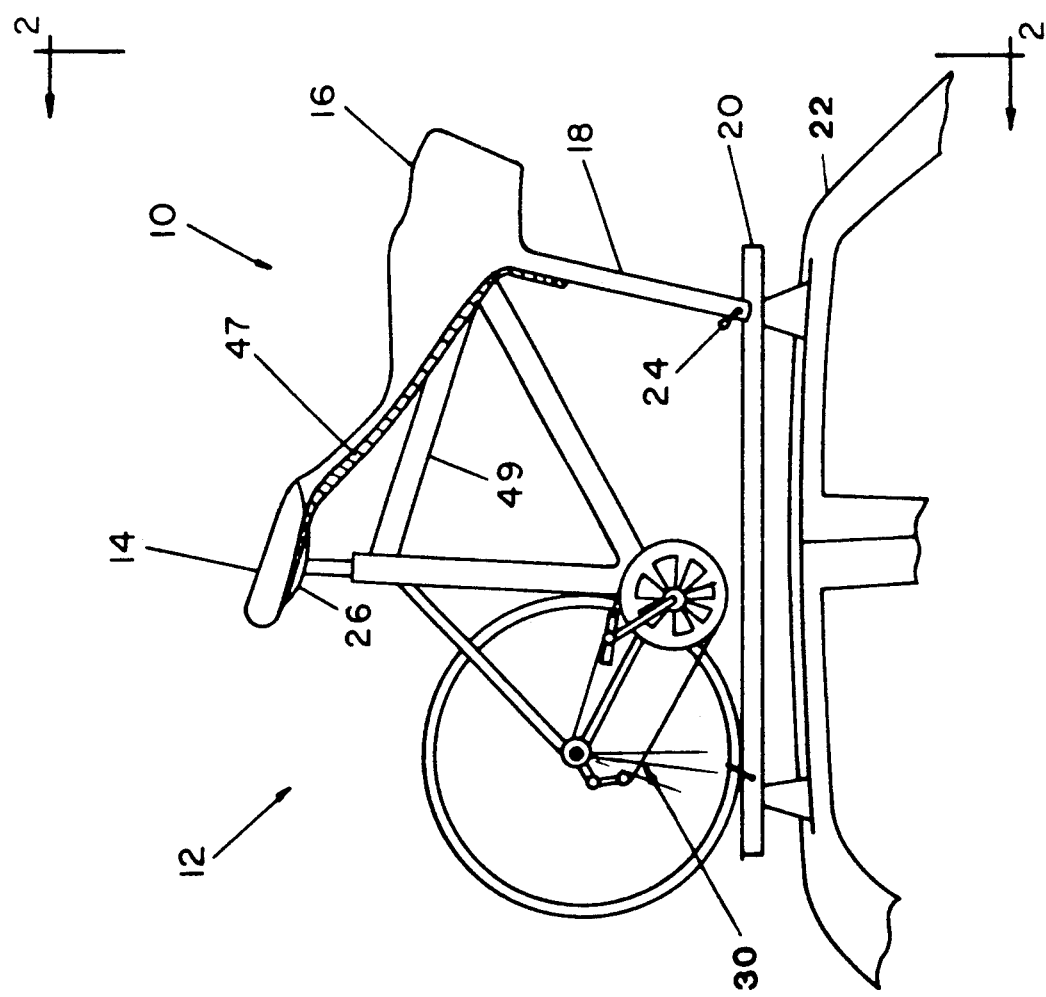
FIG. 1 is a side elevation view of a first embodiment of the flexible cover of the present invention installed on a roof-mounted bicycle.

Referring to FIGS. 1 and 2, the flexible bicycle cover 10 is illustrated in its installed position on a bicycle 12. The cover 10 comprises a continuous piece of stretchable material consisting of a seat cover portion 14, a handle bar cover portion 16 and a front fork cover portion 18. The bicycle 10 is mounted on a car top carrier 20 which is securely fastened to a car roof 22. The bicycle 10 is releasably affixed to the carrier 20 with at least one quick release skewer 24.

The seat cover portion 14 slips over bicycle seat 26 and is held securely in place by elastic attachment means 28 that run continuously from one side of the handle bar cover portion 16, around the back and underside of seat 26 to the opposite side of handle bar cover portion 16. The cover illustrated in FIG. 1 is preferably utilized when the front bicycle wheel has been removed for easier transportation of the bicycle 12. As can be seen in FIG. 2, with the exception of the drive train 30, the front profile of the flexible bicycle cover 10 shields the bicycle from highway contaminants as the car travels in a forward direction.

Figure 3:
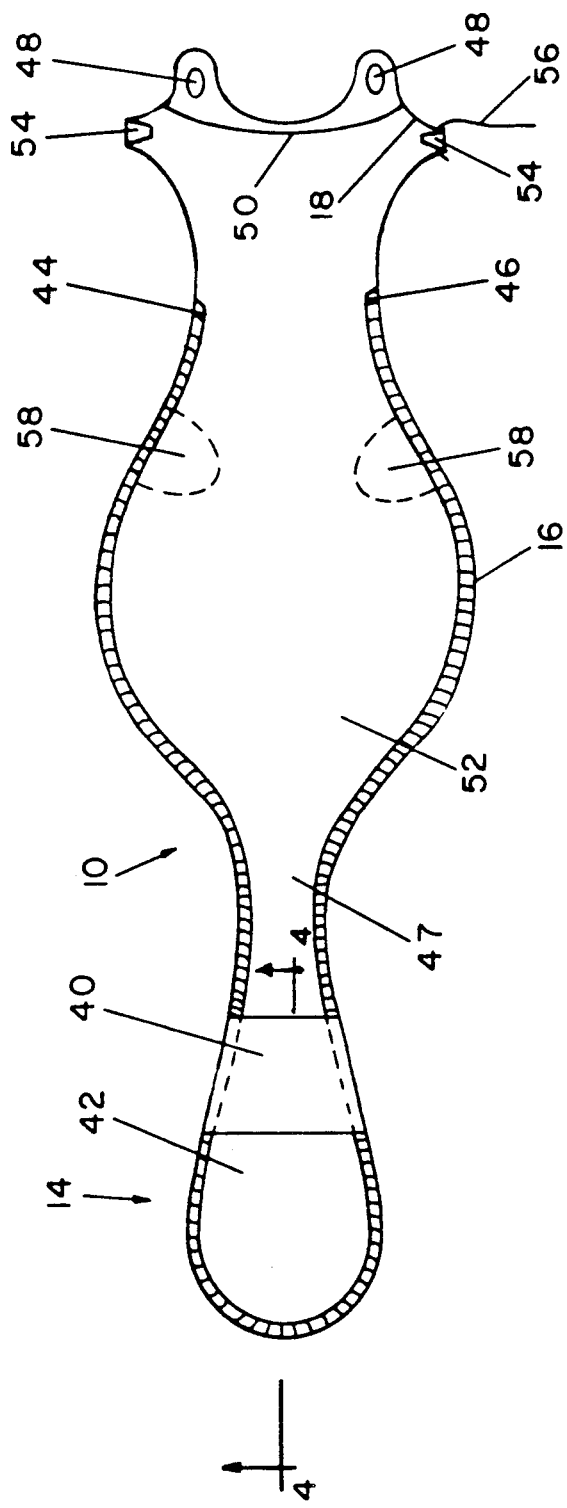
FIG. 3 is a bottom plan view of the flexible cover of the present invention.

FIG. 3 illustrates the details of construction of the bicycle cover 10. Seat cover portion 14 is provided with a waterproof seat pocket member 40 and a waterproof seat cover 42. The waterproof seat cover 42 repels water from the seat while in transit. The front horn portion of bicycle seat slips into seat pocket member 40 to maintain the flexible cover 10 in place over the seat 26. Elastic means 28, which may be in the form of a conventional shock cord, extends continuously around the handle bar cover portion 16 from 44, around the seat cover portion 14 and back around handle bar portion to 46. The seat cover portion 14 and handle bar portion 16 are continuously interconnected with fabric tongue 47, which covers crossbar 49. The front fork cover portion 18 is provided with a pair of apertures 48 that are engaged by a skewer 24 to hold the flexible cover 10 in position on the bicycle while in transit. The front fork cover portion 18 is provided with a reinforced portion 50. For example the stretchable fabric material 52 may be folded upon itself and sewn to provide additional strength. A pair of loops 54 are provided to secure the front fork cover portion 18 behind the front fork of the bicycle during transit. The loops 54 may be fastened by any conventional means, such as hook-and-pile fasteners sold under the Velcro TM trademark, by snaps or by inserting a string 56 through each loop 54 and tying a knot. Pockets 58 are formed in the handle bar cover portion, as by sewing extra pieces of stretchable material 52 into the flexible cover 10. Such pockets are necessary in order to tightly enclose the handle bars and brake levers of the bicycle 12.

Figure 4:
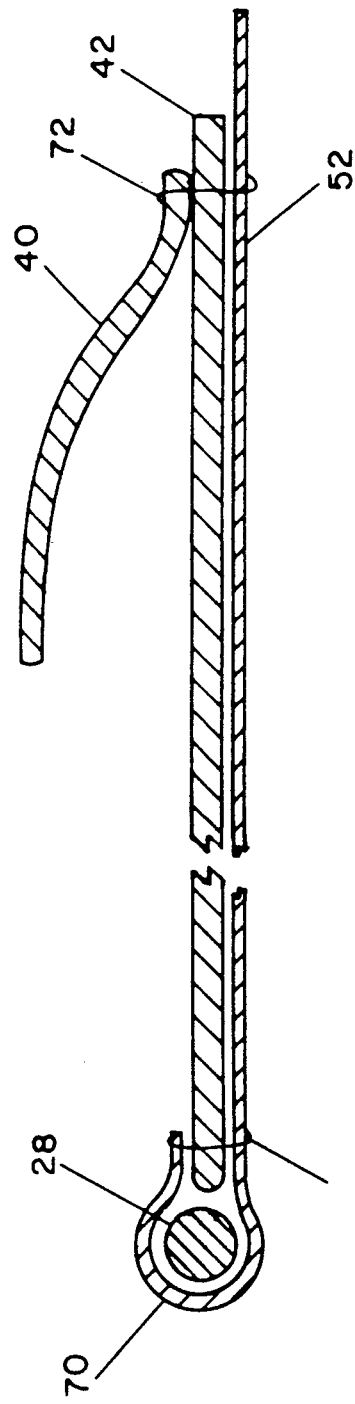
FIG. 4 is a sectional view taken along lines 4—4 of FIG. 3.

FIG. 4 illustrates a cross-section of the seat cover portion 14, with stretchable material 52 rolled over at the edge 70 to enclose elastic means 28, gathered, and then sewn with thread 72, through the waterproof seat cover 42.

Figure 5:
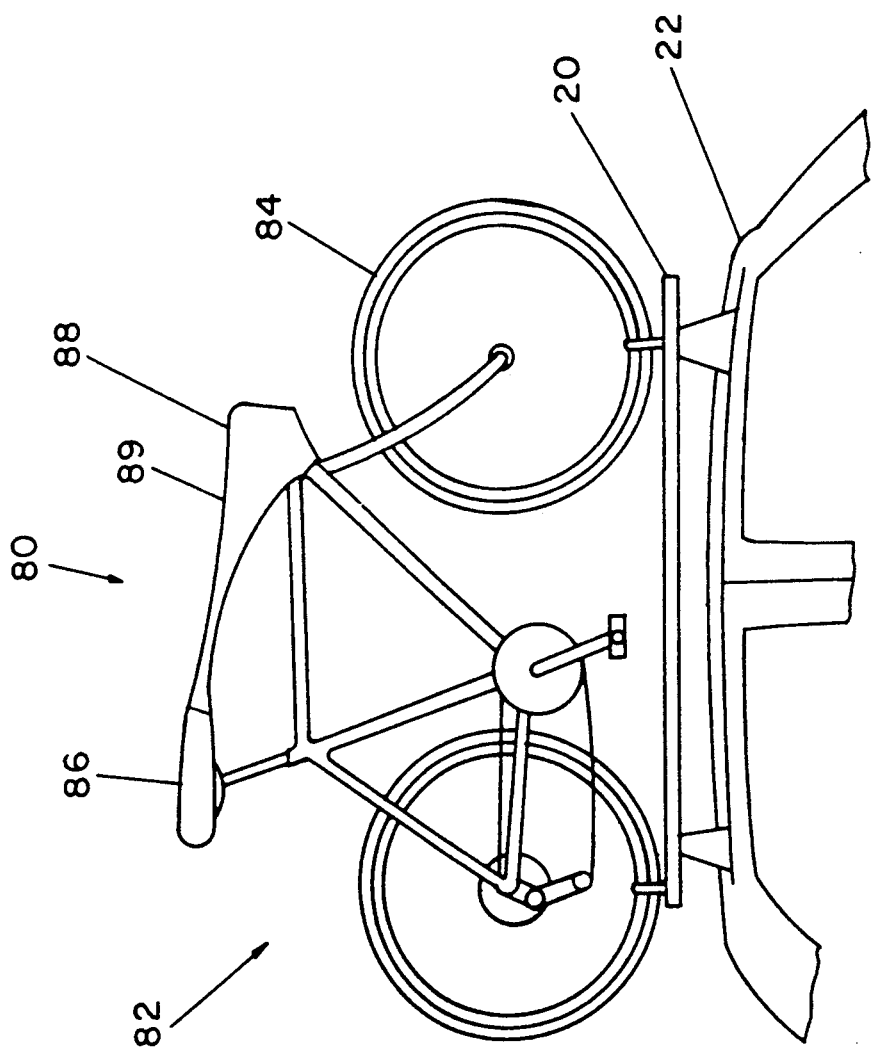
FIG. 5 is a side elevation view of a second embodiment of the present invention.

A second embodiment of the flexible protective cover 10 is illustrated in FIG. 5. The seat cover portion 12 and the handle bar cover portion 14 are identical, however no front fork cover portion 18 is provided. By terminating fabric 52 and connecting the elastic means 28 between points 44 and 46, the device of FIG. 3 may be modified into the embodiment of FIG. 5. The flexible cover 80 of FIG. 5 is used on a car top mounted bicycle 82 transported with the front wheel 84 in place. The cover 80 comprises a similar seat cover portion 86 which is contiguous with handle bar cover portion 88 by virtue of fabric tongue 89. The flexible cover 80 protects only the upper portions of bicycle 82 while mounted on car top bicycle rack 20 attached to car roof 22.

Figure 6:
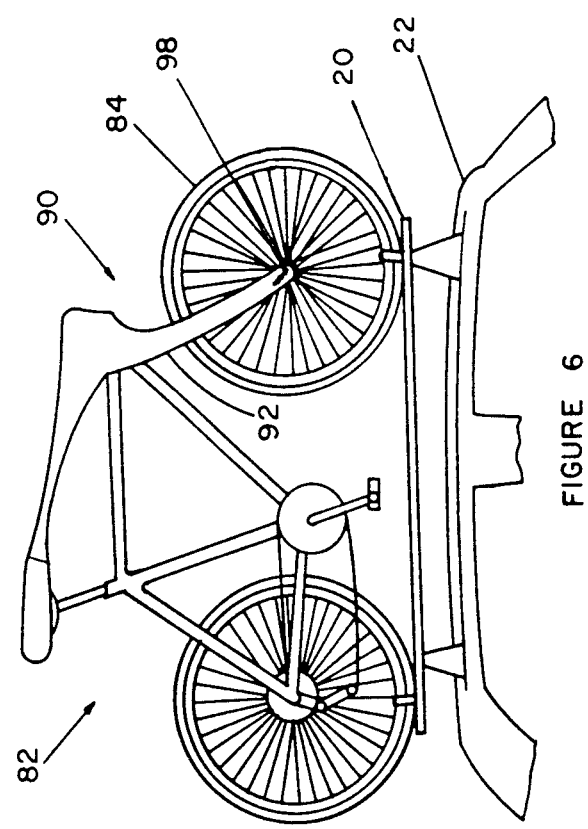
FIG. 6 is a side elevation view of a third embodiment of the present invention.

Referring to FIG. 6, a third embodiment of the invention comprises a split front fork cover 90 installed on a bicycle with the front wheel in place. The front fork cover portion 92 comprises a pair of cover members 94, 96 which extend on either side of wheel 84 in front of and adjacent each of the forks. The members 94, 96 attach to the bicycle at skewers 98.

Figure 7:
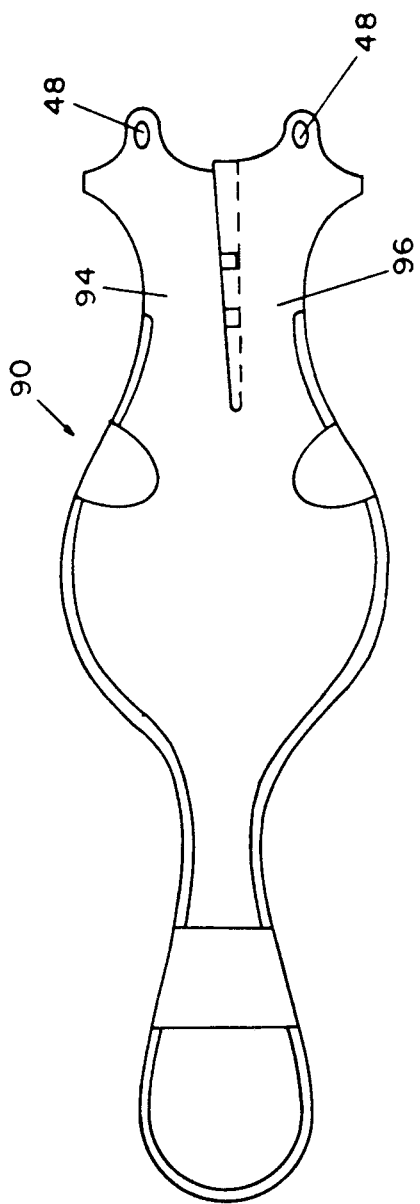
FIG. 7 is a bottom plan view of the third embodiment of the present invention.

FIG. 7 illustrates in plan view the location of members 94, 96. This embodiment may be utilized in the manner disclosed in FIG. 1 by securing the members 94, 96 to one another by snaps, Velcro TM strips, buttons or other means well-known to those skilled in the art, and by securing the portions 94, 96 to the frame through apertures 48.

The cover 10 illustrated in FIG. 3 can be installed on a bicycle having the front wheel 84 in place (as illustrated in FIG. 5) by folding the front fork cover portion 18 under the handle bar portion 16 and tying loops 54 together around any convenient bicycle part in the handle bar area.

The waterproof seat portions can be made from any strong, flexible waterproof coated material. The preferred material for the stretchable material is a blend of an elastic fiber and Nylon TM in the ratio of about 15:85% respectively. However, blends of from about 5-25% elastic fiber and from about 75-95% Nylon TM are operative. It is to be understood that the cover of the present invention must be provided in a stretchable material to acquire the benefits set forth herein.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. An elastic continuous protective cover for a bicycle being transported by a vehicle, said bicycle having front forks, handlebars, a seat, and a front wheel removed, the cover comprising:
    a. a depending front fork cover portion having means for attaching said cover portion to the front fork at the end thereof;
    b. a handle bar cover portion continuously connected to the front fork cover portion;
    c. a seat cover portion continuously connected to the handle bar cover portion and including a pocket for fitting over the seat;
    d. a connecting fabric portion continuously connecting the handle bar cover portion and the seat cover portion and having a small cross-wind profile;
    e. each of the front fork cover portion and the handle bar cover portion being expandable to elastically surround the handle bars and front fork of the bicycle; and
    f. elastic attachment means formed continuously from one side of said handle bar cover portion around said seat cover portion to an opposite side of said handle bar cover portion, whereby the flexible cover protects the forks, handle bars, and seat of the bicycle, while providing a small cross-wind profile.

2. A flexible protective cover as recited in claim 1, wherein said cover is made of a blend of elastic fiber and Nylon TM.

3. A flexible protective cover as recited in claim 2, wherein the blend of elastic fiber and Nylon TM from about 5-25% elastic fiber and from about 75-95% Nylon TM.

4. A flexible protective cover as recited in claim 3, wherein the blend of elastic fiber and Nylon TM is provided in a ratio of about 15:85.

5. A flexible protective cover as recited in claim 1, wherein the attachment means comprises apertures to affix the front fork cover portion to a bicycle rack.

* * * * *